US 6,687,024 B1

(12) United States Patent
Short et al.

(10) Patent No.: US 6,687,024 B1
(45) Date of Patent: Feb. 3, 2004

(54) IMAGE TRANSFER DEVICE CALIBRATION LABEL AND METHOD OF MAKING AND USING SAME

(75) Inventors: D. Bradley Short, San Diego, CA (US); Michael S. Gray, Encinitas, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/365,088

(22) Filed: Jul. 30, 1999

(51) Int. Cl.[7] .................................................. H04N 1/04
(52) U.S. Cl. ........................ 358/474; 358/406; 358/497; 358/471
(58) Field of Search ................................ 358/406, 471, 358/497, 474, 486, 488, 461, 504, 1.15; 156/290; 399/379, 380, 394, 395

(56) References Cited

U.S. PATENT DOCUMENTS

| 4,342,047 A |   | 7/1982  | Niemczyk et al. .......... 358/504 |
|-------------|---|---------|-----------------------------------|
| 4,974,098 A | * | 11/1990 | Miyakawa et al. ......... 358/406 |
| 5,146,351 A |   | 9/1992  | Maehara .................... 358/448 |
| 5,214,518 A |   | 5/1993  | Kato ........................... 358/448 |
| 5,402,252 A |   | 3/1995  | Kojima ....................... 358/486 |
| 5,426,581 A |   | 6/1995  | Kishi et al. .................... 700/64 |
| 5,530,239 A |   | 6/1996  | Konishi et al. .......... 250/208.1 |
| 5,535,021 A |   | 7/1996  | Chiang et al. .............. 358/474 |
| 5,559,612 A |   | 9/1996  | Kanemitsu .................. 358/471 |
| 5,642,202 A |   | 6/1997  | Williams et al. ............ 358/406 |
| 6,011,632 A | * | 1/2000  | Chiang ........................ 358/406 |
| 6,028,681 A | * | 2/2000  | Gray et al. .................. 358/475 |
| 6,178,015 B1| * | 1/2001  | Lee et al. .................... 358/486 |
| 6,327,047 B1| * | 12/2001 | Motamed .................. 358/1.15 |
| 6,388,778 B1| * | 5/2002  | Ko-Chien .................... 358/497 |

OTHER PUBLICATIONS

U.S. patent application SN 08/986,122, filed Dec. 5, 1997 Applicants: Michael S. Gray et al.

* cited by examiner

*Primary Examiner*—Cheukfan Lee

(57) ABSTRACT

A device for calibrating a scanner, including a transparent plate installable in the scanner, for supporting a document containing indicia to be transferred, and an elongated calibration label fixed to the plate adjacent to, and parallel, with an edge thereof. The label includes an opaque white substrate having a bottom surface which includes a first zone containing white calibration ink and a second zone containing black calibration ink. The white ink contains machine readable information comprising data for controlling skew, magnification, and document reference while the black ink contains data for controlling black calibration. The top surface of the calibration label includes reference indicia for aiding a user in operating the scanner. The first and second zones are surrounded by an adhesive zone for adhering the label to the plate and for isolating the zones from environmental contaminants. A method is provided for fixing the label to a scanner plate for installation in a scanner bezel.

20 Claims, 4 Drawing Sheets

IMAGE TRANSFER DEVICE CALIBRATION LABEL AND METHOD OF MAKING AND USING SAME

BACKGROUND OF THE INVENTION

The present invention relates generally to image transfer devices and, more particularly, to techniques for calibrating such devices and for locating a document therewithin.

Image transfer devices, such as scanners, copiers, photocopiers and the like are in virtually universal use. They provide efficient and effective techniques for transferring images from one medium to another. It is important in most cases that the copy accurately represent the original.

With accurate copying as a goal, the design and manufacture of image transfer devices present a myriad of challenges ranging across a broad spectrum of engineering disciplines. For example, a suitable optical system, under microprocessor control, must be controlled to move in a housing having many moving parts. In typical cases, the device is used by an operator who knows and cares little about machine function and is interested only in the end result. Complicating the situation is the fact that differing sizes of documents, legal, A4 and letter size paper, for example, may be involved and these may be in color. For these reasons, expensive firmware algorithms are required for controlling system operations in some conventional scanners.

A challenge for the image transfer device manufacturer is to make a product capable of effective operation in a variety of environments, faithfully reproducing a variety of media, in black and white and color, while substantially reducing the necessity of input from the operator. Attempts to meet this challenge often result in an increase in firmware algorithmic controls, in spite of the desirability of reducing such controls to achieve a simpler and less expensive system.

For reasons of convenience, the following description will relate to scanners but it will be recognized by those skilled in the art that the principles herein apply as well to other image transfer devices, such as copiers and the like.

In a conventional scanner, a document to be copied is placed on a glass plate, housed in a bezel, while a scan head moves on a rod along a y axis during the copying operation. In order for a true copy to result, relationships among rod and bezel, and bezel and glass, must be carefully controlled. Conventional image transfer devices sometimes fail to afford appropriate component mechanical alignment and, as a result, copies of poor quality result.

Another important factor in scanner operation relates to calibration of the device. In some cases, this is accomplished immediately prior to an individual scan. In conventional devices, the scanner calibrates from a white ink or white material, in the form of a sticker, attached to the glass plate. Such techniques can result in diminished copy quality or in a need for expensive firmware to compensate for system shortcomings.

For example, in scanners where a white sticker is applied to the glass, placement is critical and, in some prior art devices, difficulty in locating the material in the same location, on a consistent basis, results in diminished scanner performance. In the case of stickers, applied directly to the glass plate, contamination of the critical calibration area is possible. Such contamination is sometimes produced by the ammonia in glass cleaners or by spillage of a beverage on the glass. These factors emphasize the need for a consistent and reliable technique for placement of scanner calibration information while diminishing the likelihood of environmental contamination.

Other problems are experienced in conventional scanners which calibrate from white ink applied directly to the glass surface. In such cases, variations in ink thickness result in changes in reflected white color intensity as seen by the scanner CCD during calibration. For example, a relatively thin area of ink presents a gray background to the CCD. In addition, scratches or imperfections in the ink can cause related pixels to be incorrectly calibrated, with defects such as streaks produced in the copy. As in the case of the white calibration sticker, environmental contaminants can impair system function. Still another problem is experienced as light piping whereby the ink displays more brightly in the center region of the ink area than at the edges.

Attempts have been made to correct the prior art problems set forth above, and to reduce non-uniform effects from back reflected light that passes through the white ink or the sticker and then reflects back through the calibration area. In some cases, a black label or backing feature is fixed to a plastic scanner bezel housing directly above the white calibration area. The glass plate with the calibration ink or attached white sticker is then loosely housed in the scanner bezel. While this technique may have some limited value, the desired level of calibration precision is still not achieved.

Another conventional solution to calibration problems is the use of silk screening on the glass plate. A limitation of this approach is a tendency for light piping to occur in the calibration area. This adds to system cost since the problem must be compensated for firmware algorithms.

The litany of prior art limitations includes yet another. In conventional scanners, because the glass plate in some cases can not be accurately located to scanner CCD pixel positions, the white calibration area can not be used for anything beside calibration. That is, no features can be integrated into the calibration area to aid in an accurate determination of parameters such as scanner skew, magnification, document reference, or black calibration information.

As a result, since the calibration area can not be dimensionally controlled well enough for accurate placement of locating features, the document origin is located on a plastic piece that is snapped into the scanner bezel. This results, once again, in less than optimal system performance because of a large tolerance stack between the scanner CCD pixel home location and the document home location.

In view of the foregoing, it is apparent that a need exists for a technique that reliably affords improved scanner calibration while substantially reducing or eliminating a need for firmware controls. Desirably, such a technique would be low in cost and easily adapted to the scanner manufacturing process.

DISCLOSURE OF THE INVENTION

The present invention affords a technique for substantially and reliably improving calibration precision while reducing costs. In a presently preferred embodiment, there is provided a device for calibrating a scanner which includes a transparent plate installable in the scanner for supporting a document containing indicia to be transferred, and an elongated calibration label fixed to the plate adjacent to, and parallel with, an edge thereof. The label includes an opaque white substrate having a bottom surface which includes a first zone containing white calibration ink and a second zone containing black calibration ink. The white ink contains machine readable information comprising data for controlling skew, magnification, and document reference while the black ink contains data for controlling black calibration. The top surface of the calibration label includes reference indicia for aiding a user in operating the scanner. The first and second zones are surrounded by an adhesive zone for adhering the label to the plate and for isolating the zones from environmental contaminants. A method is provided for fixing the label to a scanner plate for installation in a scanner bezel.

A presently preferred embodiment of the invention affords several advantages with respect to the prior art. White and black calibration are efficiently and effectively achieved without concern for variations in silkscreen thickness since the ink is applied to an opaque surface. Because ink to printing tolerances are easily and relatively tighter to control, new features can be incorporated into the calibration area of the label. These features may include, for example, scanner skew, magnification, document reference, and black calibration.

Another advantage of the present invention relates to protection of the calibration area from environmental contamination. With fixation of the label to the glass plate, an adhesive moat is formed around the calibration area. This moat prevents color contamination from moisture or damage from liquids such as beverages or ammonia from glass cleaning fluids.

In addition, since the calibration label is adhesively attached to the glass at the adhesive moat, the white and black calibration areas are in direct, but not intimate, contact with the glass surface. This factor allows improved simulation of how a document is viewed. The result is improved scanning precision.

Further, the novel calibration label of the present invention can now be utilized for document placement, so external borders to place a document are no longer required and cosmetic artwork can be located opposite the calibration side of the label to direct the user of the scanner how to place a document.

Finally, enhanced construction of calibration color and calibration placement allow for relaxed manufacturing tolerances and a reduction in total system parts, without any sacrifice in system performance.

In summary, a device embodying the invention is easy to install and mechanically simple. Yet, in contrast to conventional scanners, it substantially increases calibration precision and system operation at reduced cost.

Other aspects and advantages of the present invention will become apparent from the following detailed description, taken in conjunction with the accompanying drawings, illustrating by way of example the principles of the invention.

BEST MODE FOR CARRYING OUT THE INVENTION

Figure 1:
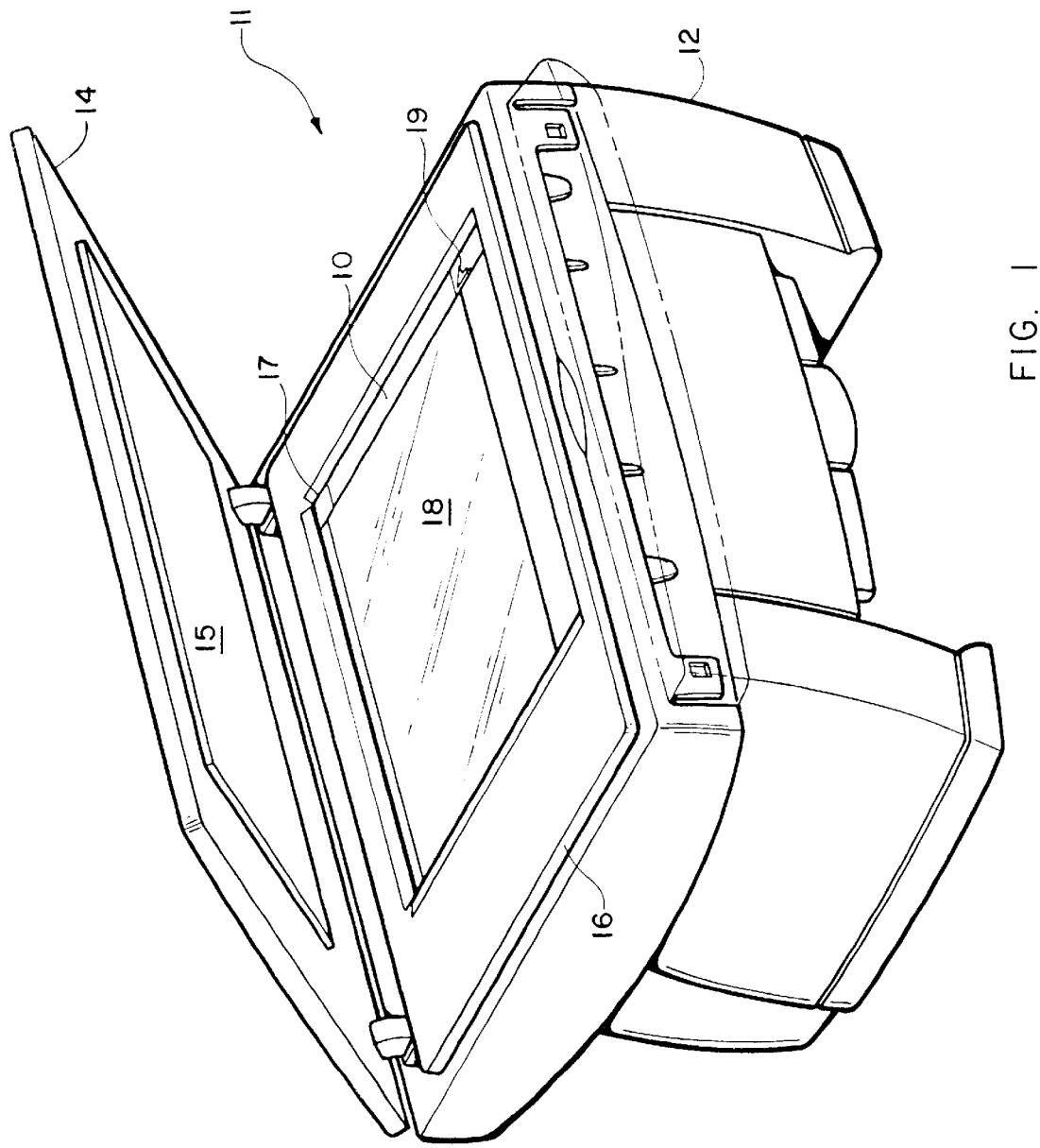
FIG. 1 is a perspective view of a scanner which includes the calibration and document locating label according to the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In the following detailed description and in the several figures of the drawings, like elements are identified with like reference numerals.

As shown in the drawings for purposes of illustration, the invention is embodied in a novel scanner calibration label and a method of accurately locating the label on a scanner plate. The calibration label according to the invention provides a substantially improved technique for achieving calibration precision at low cost.

Figure 2:
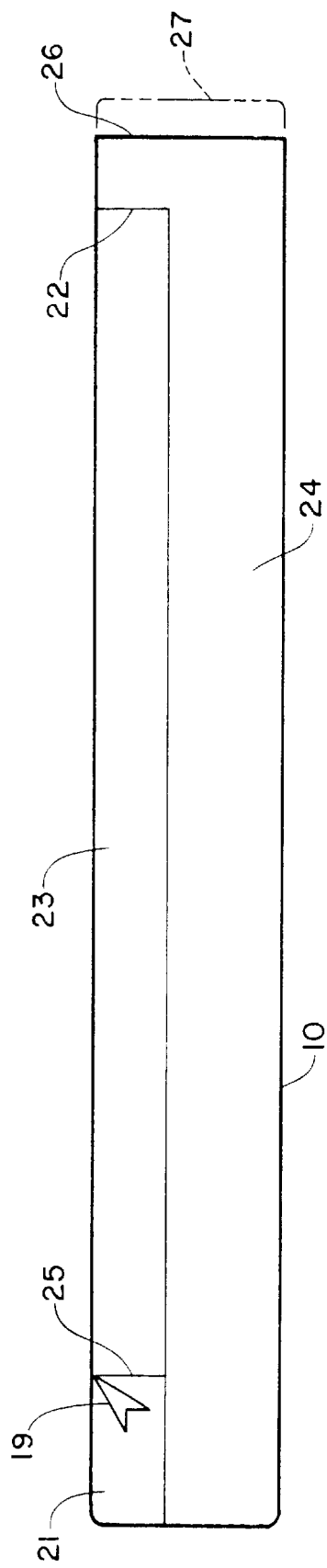
FIG. 2 is a top plan view of a calibration label according to the present invention.
Figure 3:
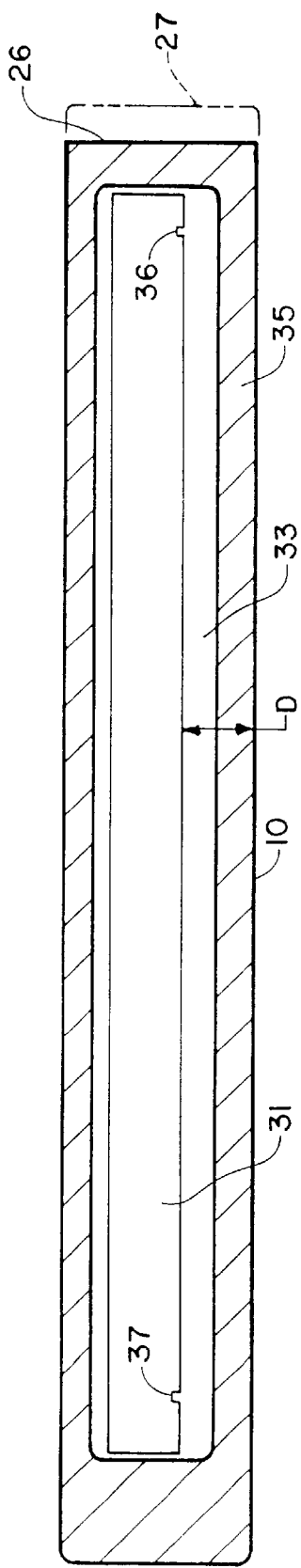
FIG. 3 is a bottom plan view of the calibration label according to the present invention.

Referring now to the drawings and in particular to FIGS. 1 through 3 thereof, there is shown a novel calibration label 10 which is constructed according to the present invention. The label 10 is utilized in a computer input device, such as a scanner 11. The scanner 11 includes a base 12 supporting a bezel 16 which holds a glass plate 18. During operation of the scanner 11, a document, (not shown) is positioned on the plate 18 and a cover 14 is moved to a closed position. A resilient document backing 15, covered by a white mylar sheet is located on the bottom of the cover 14. The backing 15 provides a white background to facilitate copying and, in addition, the backing aids in urging the document against the plate 18 during copying.

The calibration label 10 is of elongated rectangular shape having a top surface, known as a "cosmetic side", shown in FIG. 2, and a "calibration side", shown in FIG. 3. The label is composed of a single white polyester layer that has a generally stiff consistency. The polyester layer provides the label 10 with opacity and a surface onto which calibration and cosmetic inks can be applied.

The label is about 1/32nd inch in thickness. The calibration side includes a white ink zone that occupies a generally central region of the label 10, extending substantially along the entire length of thereof. It is completely surrounded by a black ink zone that, in turn is surrounded by a pattern adhesive.

While some conventional scanners utilize calibration labels, for the most part such labels do not include artwork located on the cosmetic side thereof. During label manufacture of the label 10, the cosmetic side is prepared first. After this side has been printed with suitable information, the top surface of the label is laminated with a clear textured polycarbonate layer. This protects the artwork from environmental conditions and provides an aesthetically pleasing appearance.

The cosmetic side contains document referencing information for use by an operator during scanner use. This side has a generally gray colored area 24 extending along one edge of the label 10. Disposed along an opposite edge of the label is a small colored area 21 which abuts a white area 23. The white area is defined laterally by edges 22 and 25. An arrow 19 is printed on the colored area 21 adjacent the edge 25. During use of the scanner 11, the operator is enabled to perform an accurate scan by placing a document against the white area 23 so that the document edge is aligned with the arrow 19. To enable further precision in scanning, the white area 23, between the edges 22 and 25, is exactly eight and one half inches in length. Thus, a typical document can be located precisely and easily by the scanner operator. In contrast to conventional scanners, since the label 10 is useful for document placement reference, external borders to aid document placement are not required.

The calibration side of the label 10, as shown in FIG. 3, will now be considered. Because ink to ink printing tolerances are easily and relatively tighter to control in the present invention, new features, including scanner skew, magnification, document reference and black calibration can be incorporated into the calibration side. As discussed more fully below, the calibration side of the label 10 is adhesively attached to the glass plate 18 and it is printed with white and black calibration inks.

As mentioned, during manufacture of the calibration label 10, the cosmetic side is first printed and laminated. This prevents contamination of the calibration side. After the cosmetic side has been laminated, white calibration ink is applied to a zone 31 on the calibration side. Since white ink is applied to a white substrate, variations in ink thickness do not have a significant impact on reflected light color to the scanner 11. This factor eases the manufacturing burden and results in reduced product cost. Further, while compensating firmware algorithms are required in conventional scanners, their need has been eliminated by the present invention.

In addition, a need for firmware algorithms is eliminated since the present invention eliminates the conventional light piping problem.

Figure 4:
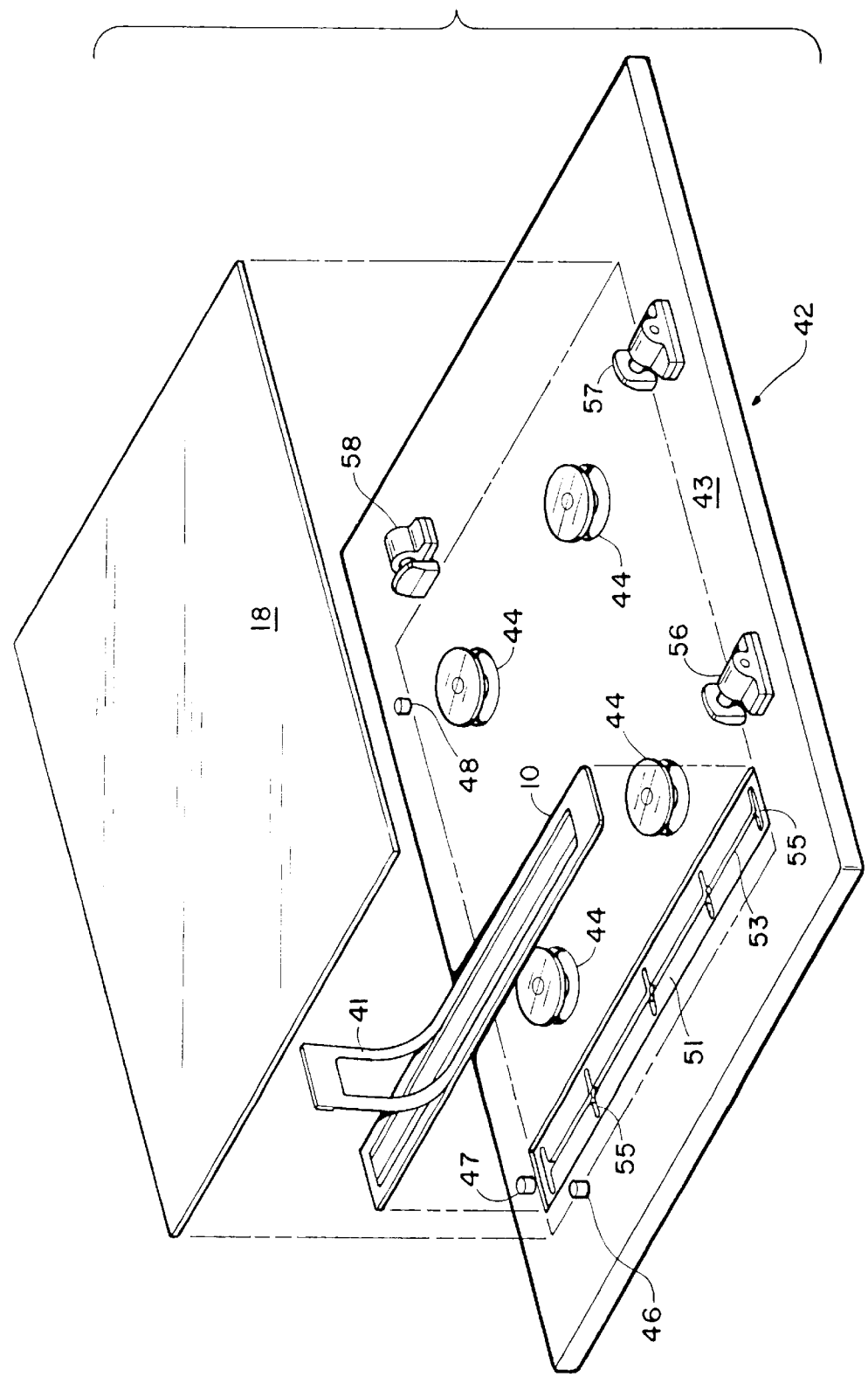
FIG. 4 is a perspective view of an assembly fixture used in attaching the label of the present invention to a document support plate.

After the white ink has been applied, black calibration ink is applied to a zone 33 which surrounds the white calibration ink zone 31. Finally, a cutout pattern adhesive is applied around the black ink zone 33. The adhesive is covered by a protective sheet 41 (FIG. 4) which is peeled away at the time the label 10 is fixed to the plate 18. In this regard, a lip 27 extends beyond an edge 26 of the label 10, to aid in removal of the protective sheet 41.

The pattern adhesive completely surrounds the calibration zones and, after adhesion to the plate 18, the adhesive itself serves to create a protective moat 35 around the calibration ink zones 31 and 33. In this manner, the calibration zones are held in direct but not intimate contact with the glass surface thereby better simulating how a document will be viewed. In addition, the moat 35 protects the calibration zones from undesirable environmental factors such as ammonia from glass cleaners or spilled beverages.

In order to provide a reference for the x scanner axis, a pair of tick marks 36 and 37 project into the white area 31 to enable the transmission of precise document reference information. In addition to affording data with respect to document location, the ticks 36 and 37 are useful for providing information relating to magnification and document skew.

In another example of the versatility of the label 10, the distance D between an edge of the white zone 31 and an outer edge of the black zone 33 can be accurately measured. In a preferred embodiment of the invention, the distance D is about 15 millimeters and it can be used to provide information relative to document location. Thus, the y axis reference is readily and efficiently provided.

In addition to a novel calibration label, the present invention affords a novel method of fixing the label to the glass scanner plate. To ensure proper canner function, it is important that the calibration label be perpendicular to the y axis of scan head travel. This is accomplished by the provision of an assembly fixture 42, shown in FIG. 4, which utilizes the datuming structure of the scanner bezel 16. In this regard, the fixture 42 includes a datum point 46 and datum points 47 and 48 for providing reference along the y axis of the scanner 11. A glass plate, such as the plate 18, and the calibration label 10 are both datumed to the assembly fixture 42, prior to removal of an adhesive backing strip 41 and attachment of the label 10 to the plate 18.

During the label to plate assembly process, the calibration label 10 is positioned in a rectangular trough 51. In the bottom of the trough 51 there is an axial slot 53, having a plurality of perpendicular slots 55. After the label 10 is placed in the trough 51, calibration side up, a vacuum is drawn on the label and air is evacuated through the slots 53 and 55. In this manner, a small pressure differential is created to aid in positioning the label 10 with respect to the plate 18. With the label 10 in position, the backing strip 41 is removed.

At this stage of the assembly process, the plate 18 is positioned against the assembly fixture 42 so that the plate rests on a plurality of springs 44 which hold the plate a few millimeters away from a base 43. Spring stops 56 and 57 urge the plate 18 against datum points 47 and 48 while a spring stop 58 performs a similar function with respect to the datum point 46. With the plate 18 correctly oriented in the fixture 42, a slight downward pressure on the plate compresses the springs 44 and brings the plate 18 into contact with the pattern adhesive of the label 10. In this manner, precise label positioning is accomplished in an economic and effective way.

Figure 5:
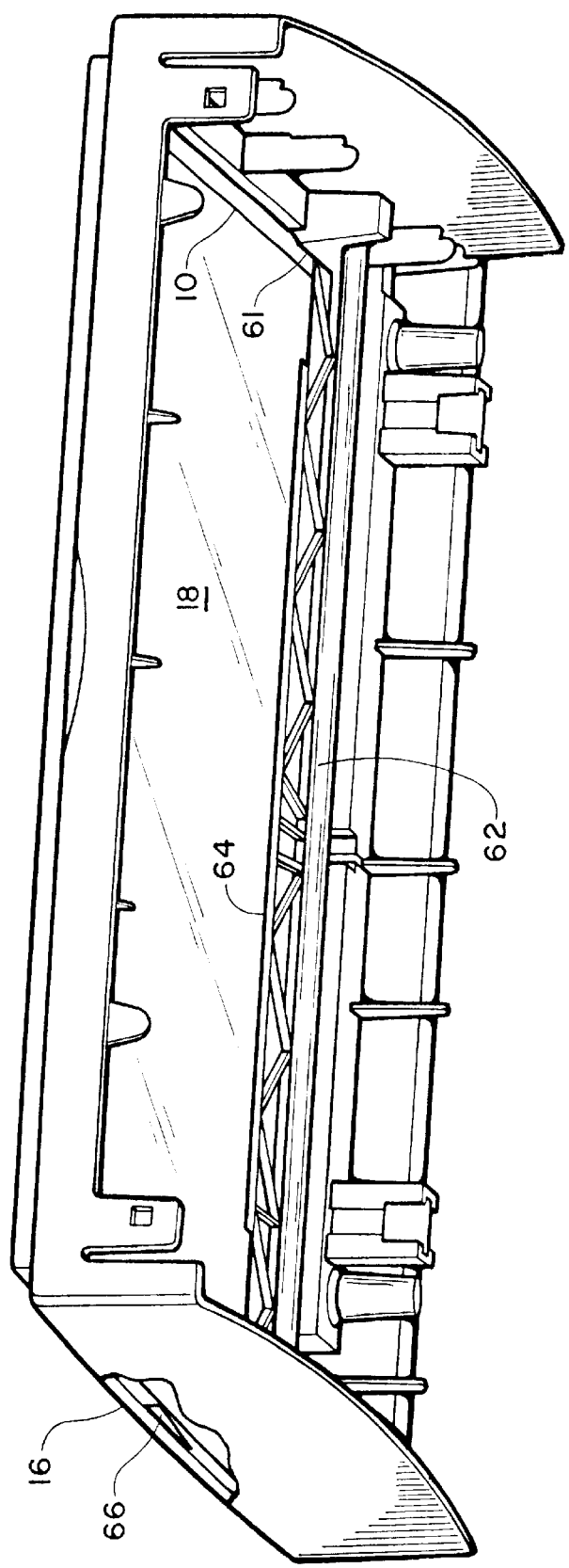
FIG. 5 is a perspective view of a scanner bezel showing the relationships among the bezel, scan head rod, document support plate and calibration label.

With reference now to FIG. 5, there is shown the bezel 16 in which the plate 18, having the calibration label 10 fixed thereto, is located. The plate 18 rests on a support 64 and is located in the bezel 16 by datuming points which are similar in relative location and function to the datuming points shown in FIG. 4. In this regard, for example, a datuming point 61 corresponds to the point 47 of FIG. 4. During assembly of the bezel 16, the plate 18 is pushed against the datuming points, such as the point 61, and held in place by a plurality of bias springs, such as the spring 66. The scanner bezel 16 is then located directly to a scanner rod 62 through spaded locating features (not shown). Because of the accuracy of assembly afforded by the fixture 42, having an architecture similar to that of the bezel 16, the calibration label 10 is located in the scanner 11 precisely perpendicular to the scanner rod 62. In this manner, precise alignment along the y axis is accomplished. In addition, the calibration label 10 is placed at a known location along the direction of travel of the scanner.

It will be noted by one skilled in the art that the above described assembly process results in more precise relationships among label, plate and bezel while reducing the number of parts required. In addition, tighter tolerances among the various components are realized with improved performance, especially in skew precision.

It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. A device for calibrating an image transfer apparatus, comprising:

a transparent plate installable in said apparatus for supporting a document containing indicia to be transferred; and an elongated label fixed to said plate adjacent to and parallel with an edge thereof, said label having an opaque surface wherein said surface includes a first zone containing a white calibration substance and a second zone containing a black calibration substance, said label further having a top surface including reference indicia for aiding a user in operating said image transfer apparatus.

2. The device according to claim 1, wherein said first zone is generally centrally disposed on said opaque surface and said second zone is peripherally disposed in relation to said first zone.

3. The device according to claim 1, wherein said first and second zones are surrounded by an adhesive zone for adhering said label to said plate and for isolating said zones from environmental contaminants.

4. The device according to claim 3, wherein said adhesive zone has a thickness sufficient to adhere said label to said plate whereby said first and second zones are held in close but not intimate contact with said plate.

5. The device according to claim 1, wherein said label is of polyester construction.

6. The device according to claim 1, wherein said top surface includes a protective polycarbonate layer.

7. The device according to claim 1, wherein said first zone includes machine readable information for controlling apparatus skew, magnification and document reference.

8. The device according to claim 1, wherein said label includes an edge for placement reference of a document placed on said plate.

9. A method of fixing a calibration label to a scanner plate, comprising the steps of:

providing a plate for supporting a document containing indicia to be transferred;

preparing a label having an opaque substrate and a bottom surface having a first zone containing white calibration ink applied to said substrate, said bottom surface additionally having a second zone containing black calibration ink, said label further including a top surface containing indicia useful to a user of said apparatus, and adhering said label to said plate adjacent to and parallel with an edge thereof.

10. The method according to claim 9, wherein said preparing step includes locating said first zone adjacent the center of said label and locating the second zone in peripheral relationship to said first zone.

11. The method according to claim 9, wherein said adhering step includes providing an adhesive zone peripherally of said second zone on said bottom surface.

12. The method according to claim 11, wherein said providing step includes adhering said adhesive zone to said plate while holding said first and second zones in separated relationship with said plate.

13. The method according to claim 9, wherein said preparing step includes providing a white opaque substrate.

14. The method according to claim 13, wherein said preparing step includes applying white ink to said opaque substrate in said first zone.

15. The method according to claim 13, wherein said preparing step includes applying black ink to said opaque substrate in said second zone.

16. The method according to claim 15, wherein said preparing step includes fixing data in said second zone for controlling image transfer device operations.

17. The method according to claim 13, wherein said preparing step includes fixing data in said first zone for controlling image transfer device operation.

18. The method according to claim 17, wherein said fixing step includes fixing data in said first zone for controlling skew, magnification and document reference in said image transfer apparatus.

19. A method of fixing a calibration label to a scanner plate for installation in a scanner bezel, the bezel having a plurality of datuming points for locating a glass plate within the bezel, comprising the steps of:

providing an assembly having a base, a first plurality of springs attached to said base for holding said glass plate away from said base, a plurality of datuming points wherein each one of said plurality of datuming points is fixed to said base and having a relationship to said base identical to the relationship a corresponding datum point has to the bezel, a second plurality of springs for biasing said glass plate against each one of said plurality of assembly datuming points and a trough for releasably holding a calibration label;

placing an adhesive backed calibration label in said trough;

positioning said glass plate between said second plurality of springs and said datuming points so that each one of said plurality of datuming points contacts an edge of said plate;

urging said plate toward the assembly base to effect adhesion between said calibration label and said plate; and releasing said plate, including said calibration label, from said assembly.

20. The method according to claim 19, wherein the assembly providing step includes providing a plurality of slotted openings in the bottom of said trough for enabling a vacuum to be drawn on the calibration label being held therein.

* * * * *